US012515465B2

(12) United States Patent
Fukasawa et al.

(10) Patent No.: US 12,515,465 B2
(45) Date of Patent: Jan. 6, 2026

(54) PRINTING APPARATUS

(71) Applicant: SEIKO EPSON CORPORATION, Tokyo (JP)

(72) Inventors: Koki Fukasawa, Shiojiri (JP); Keisuke Kitahara, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 72 days.

(21) Appl. No.: 18/366,487

(22) Filed: Aug. 7, 2023

(65) Prior Publication Data

US 2024/0051311 A1 Feb. 15, 2024

(30) Foreign Application Priority Data

Aug. 9, 2022 (JP) ................................ 2022-126866

(51) Int. Cl.
*B41J 2/01* (2006.01)
*B41J 11/00* (2006.01)
*B41J 11/04* (2006.01)
*B41J 11/08* (2006.01)
(Continued)

(52) U.S. Cl.
CPC ............... *B41J 15/046* (2013.01); *B41J 2/01* (2013.01); *B41J 11/001* (2013.01); *B41J 11/0025* (2013.01); *B41J 11/0045* (2013.01); *B41J 11/04* (2013.01); *B41J 11/08* (2013.01); *B41J 15/08* (2013.01)

(58) Field of Classification Search
CPC ............ B41J 2/005; B41J 2/01; B41J 11/001; B41J 11/0025; B41J 11/0045; B41J 11/02; B41J 11/08; B41J 15/04; B41J 15/046; B41J 15/08
See application file for complete search history.

(56) References Cited

U.S. PATENT DOCUMENTS

2001/0007227 A1* 7/2001 Miyazaki .............. B65H 16/06
101/228
2010/0025917 A1* 2/2010 Yamaguchi ............ B65H 5/062
271/10.13

(Continued)

FOREIGN PATENT DOCUMENTS

| | | | |
|---|---|---|---|
| JP | 2013014397 A | * | 1/2013 |
| JP | 2016120652 A | * | 7/2016 |
| JP | 2018-103476 A | | 7/2018 |

*Primary Examiner* — Douglas X Rodriguez
*Assistant Examiner* — Kendrick X Liu
(74) *Attorney, Agent, or Firm* — WORKMAN NYDEGGER

(57) ABSTRACT

A printing apparatus includes an insertion port that is provided in a transport path of a medium and through which the medium is to be inserted; a roller pair configured to nip and transport the medium inserted through the insertion port, in the transport path, the roller pair comprises rollers facing each other; a printing unit configured to perform printing on the medium transported in the transport path by the roller pair; and a lever configured to switch a position of at least one roller of the roller pair between a nipping position where the roller pair is configured to nip the medium and a separation position where the roller pair does not nip the medium. A first lever as the lever is arranged within a range in which the medium transported by the roller pair is present, in a width direction intersecting with a transport direction of the medium.

14 Claims, 6 Drawing Sheets

(51) Int. Cl.
*B41J 15/04* (2006.01)
*B41J 15/08* (2006.01)

(56) References Cited

U.S. PATENT DOCUMENTS

| | | | | |
|---|---|---|---|---|
| 2012/0169804 | A1* | 7/2012 | Miyashita .............. | B65H 5/062<br>347/104 |
| 2017/0158448 | A1* | 6/2017 | Suzuki ................. | G03G 15/652 |

* cited by examiner

PRINTING APPARATUS

The present application is based on, and claims priority from JP Application Serial Number 2022-126866, filed Aug. 9, 2022, the disclosure of which is hereby incorporated by reference herein in its entirety.

BACKGROUND

1. Technical Field

The present disclosure relates to a printing apparatus.

2. Related Art

Hitherto, various types of printing apparatuses have been used. Of these, some printing apparatuses perform printing while a medium is nipped between a roller pair and transported. For example, JP-A-2018-103476 discloses a printing apparatus that includes a roller pair for nipping and transporting a sheet and that includes, at an end thereof, a lever for switching a nipping state of the sheet between the roller pair.

However, in the printing apparatus of JP-A-2018-103476, the lever for switching the nipping state of the sheet between the roller pair is provided at the end in a width direction, and hence the lever is away from a position of a user when the sheet is set in the printing apparatus. Thus, in some cases, it is difficult for a user to set the sheet alone while the user presses the sheet. In particular, when the sheet is set in the printing apparatus, an end of the sheet in a width direction is easily bent. In a case in which a user in the vicinity of the end sets the sheet in the printing apparatus so as to avoid bending of the end, when the lever is provided at the end on the side opposite to the position of the user, it is particularly difficult for the user to set the sheet alone while the user presses the sheet. Therefore, in the related-art printing apparatus that performs printing while the medium is nipped between the roller pair and transported, operability for setting the medium is not always satisfactory.

SUMMARY

In order to solve the above-mentioned problem, a printing apparatus according to the present disclosure includes an insertion port that is provided in a transport path of a medium and through which the medium is to be inserted, a roller pair configured to nip and transport the medium inserted through the insertion port, in the transport path, the roller pair comprises rollers facing each other, a printing unit configured to perform printing on the medium transported in the transport path by the roller pair, and a lever configured to switch a position of at least one roller of the roller pair between a nipping position where the roller pair is configured to nip the medium and a separation position where the roller pair does not nip the medium, in which a first lever as the lever is arranged within a range in which the medium transported by the roller pair is present, in a width direction intersecting with a transport direction of the medium.

DESCRIPTION OF EMBODIMENTS

Figure 1:
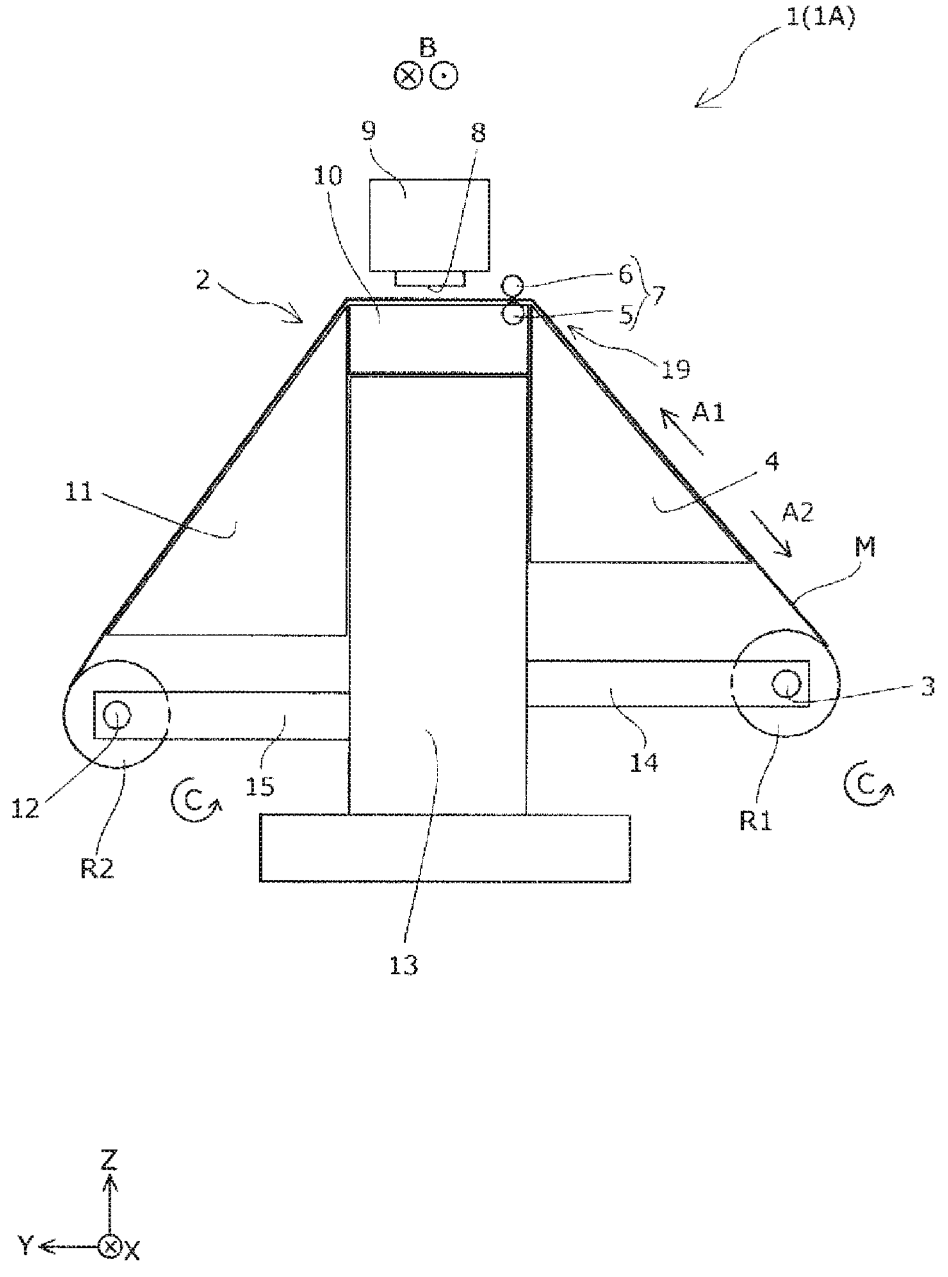
FIG. 1 is a schematic view of a printing apparatus according to a first exemplary embodiment of the present disclosure.

First, the present disclosure is schematically described.

In order to solve the above-mentioned problem, a printing apparatus according to a first aspect of the present disclosure includes an insertion port that is provided in a transport path of a medium and through which the medium is to be inserted, a roller pair configured to nip and transport the medium inserted through the insertion port, in the transport path, the roller pair comprises rollers facing each other, a printing unit configured to perform printing on the medium transported in the transport path by the roller pair, and a lever configured to switch a position of at least one roller of the roller pair between a nipping position where the roller pair is configured to nip the medium and a separation position where the roller pair does not nip the medium, in which a first lever as the lever is arranged within a range in which the medium transported by the roller pair is present, in a width direction intersecting with a transport direction of the medium.

According to the present aspect, the first lever for switching between the nipping position where the medium can be nipped and the separation position where the medium is not nipped is arranged within the range in which the medium transported by the roller pair is present, in the width direction. Thus, a user can set the medium alone while the user presses the medium, and operability for setting the medium can be improved.

A printing apparatus according to a second aspect of the present disclosure is that according to the first aspect, in which the first lever is provided extending in an advancing and retreating direction of the medium with respect to the insertion port.

According to the present aspect, the first lever is provided extending in the advancing and retreating direction of the medium with respect to the insertion port. Thus, operability of the first lever for setting the medium can be particularly improved.

A printing apparatus according to a third aspect of the present disclosure is that according to the first aspect or the second aspect, in which the printing apparatus includes a plurality of the first levers.

According to the present aspect, the printing apparatus includes a plurality of the first levers. Thus, even when the medium having a large width is used, operability of the first lever for setting the medium can be improved.

A printing apparatus according to a fourth aspect of the present disclosure is that according to the first aspect or the second aspect, in which a second lever as the lever is included, the second lever being arranged outside the range in which the medium transported by the roller pair is present, in the width direction.

According to the present aspect, the second lever is included that is arranged outside the range in which the medium transported by the roller pair is present, in the width direction. Thus, even when the medium having a large width is used, operability of the lever for setting the medium can be improved.

A printing apparatus according to a fifth aspect of the present disclosure is that according to the first aspect or the second aspect, in which a foreign matter capturing unit configured to suppress entry of a foreign matter through the insertion port is included, the foreign matter capturing unit is configured to be displaced between a foreign matter capturing position where the foreign matter capturing unit is configured to come into contact with the medium transported and a retracting position where the foreign matter capturing unit does not come into contact with the medium transported, and the first lever is configured to switch the foreign matter capturing unit between the foreign matter capturing position and the retracting position.

According to the present aspect, the first lever is configured to switch the foreign matter capturing unit configured to suppress entry of a foreign matter through the insertion port, between the foreign matter capturing position and the retracting position. Thus, entry of a foreign matter through the insertion port can be suppressed. At the same time, the first lever is capable of also functioning as a switching unit for the foreign matter capturing unit, and hence there is no need to additionally provide a switching unit for the foreign matter capturing unit.

A printing apparatus according to a sixth aspect of the present disclosure is that according to the fifth aspect, in which the first lever is configured to switch the foreign matter capturing unit between the foreign matter capturing position and the retracting position, in conjunction with the position of the roller.

According to the present aspect, the first lever is configured to switch the foreign matter capturing unit between the foreign matter capturing position and the retracting position, in conjunction with the position of the roller. Thus, switching of the foreign matter capturing unit can be particularly facilitated.

A printing apparatus according to a seventh aspect of the present disclosure is that according to the first aspect or the second aspect, in which the insertion port is arranged below the roller pair in a vertical direction.

According to the present aspect, the insertion port is arranged below the roller pair in the vertical direction. Thus, the medium is easily inserted from below. Further, in a configuration in which the medium is inserted from below, operability for setting the medium can be improved.

A printing apparatus according to an eighth aspect of the present disclosure is that according to the first aspect or the second aspect, in which a height at which the insertion port is arranged is 1,000 mm or lower.

According to the present aspect, the height at which the insertion port is arranged is 1,000 mm or lower. Thus, a user can easily insert the medium through the insertion port while the user squats down. Further, while a user squats down, operability for inserting the medium through the insertion port can be improved.

A printing apparatus according to a ninth aspect of the present disclosure is that according to the first aspect or the second aspect, in which the first lever is arranged at a position within 22 inches from a center of the printing apparatus in the width direction.

According to the present aspect, the first lever is arranged at a position within 22 inches from the center of the printing apparatus in the width direction. Thus, a user easily reaches the first lever by hand.

A printing apparatus according to a tenth aspect of the present disclosure is that according to the first aspect or the second aspect, in which the printing apparatus is configured to be used with the medium measuring 44 inches or larger in the width direction.

In general, in a configuration in which the medium having a large width of 44 inches or larger in the width direction can be used, operability for setting the medium is easily degraded. However, according to the present aspect, even when the medium measuring 44 inches or larger in the width direction is used, a user can easily reach the first lever by hand, and operability for setting the medium can be improved.

First Exemplary Embodiment

With reference to the drawings, exemplary embodiments of the present disclosure are specifically described below. First, with reference to FIG. 1, an overview of a printing apparatus 1 according to an exemplary embodiment of the present disclosure is described. Note that, in FIG. 1, some component elements are omitted for clarity of the configuration. Here, in the drawings, an X-axis direction is a horizontal direction and a direction in which a rotation shaft of a holding unit 3 extends. The holding unit 3 holds a roll body R1 obtained by winding a medium M into a roll shape. A Y-axis direction is a horizontal direction, a front-and-rear direction of the printing apparatus 1, and a direction orthogonal to the X-axis direction. A Z-axis direction is a vertical direction. Further, hereinafter, an arrow direction is a + direction, and a direction opposite to the arrow direction is a − direction. For example, a vertical upward direction is a +Z direction, a vertical downward direction is a −Z direction, a frontward direction from the printing apparatus 1 is a +Y direction, and a rearward direction from the printing apparatus 1 is a −Y direction.

As the printing apparatus 1, a printing apparatus 1A of the present exemplary embodiment includes a main body unit 2. Legs 13 are attached to both the end parts of the main body unit 2 in the X-axis direction. Further, the printing apparatus 1A of the present exemplary embodiment includes the holding unit 3 that holds the roll body R1 obtained by winding the medium M into a roll shape on a side in the −Y direction, which corresponds to the rear side of the main body unit 2. The holding unit 3 functions as a feeding unit that feeds the medium M being the roll body R1 to the main body unit 2, and is provided to an arm 14 attached to a pipe (not illustrated) for coupling the legs 13 on both sides in the X-axis direction to each other.

Further, in the printing apparatus 1A of the present exemplary embodiment, when the medium M is transported in a first direction A1 being a transport direction, the holding unit 3 including the rotation shaft along the X-axis direction rotates in a rotation direction C. Further, when the medium M is transported in a second direction A2 being a direction opposite to the first direction A1, the holding unit 3 including the rotation shaft along the X-axis direction rotates in a direction opposite to the rotation direction C. Note that, in the present exemplary embodiment, there is used the roll body R1 wound so that a printing surface on which an image is formed faces outward. When the roll body R1 wound so that the printing surface faces inward is used, the holding unit 3 can rotate in the direction opposite to the rotation direction C to feed the medium M from the roll body R1.

Further, the printing apparatus 1A of the present exemplary embodiment includes a transport path of the medium M. The transport path includes a medium support unit 4, a medium support unit 10, and a medium support unit 11 that support the medium M, and the like. Further, the printing apparatus 1A includes a roller pair 7 including a driving roller 5 and driven rollers 6 in the transport path, as a transport unit that transports the medium M in the first direction A1 and the second direction A2. Note that, in the printing apparatus 1A of the present exemplary embodiment, the driving roller 5 is configured as a roller extending in a width direction B intersecting with the first direction A1 and the second direction A2. The driven rollers 6 are a plurality of rollers that are provided and arrayed in the width direction B with respect to the driving roller 5 at positions facing the driving roller 5. However, the configuration of the transport unit is not limited thereto.

Further, the printing apparatus 1A of the present exemplary embodiment includes a head and a carriage 9 at a position facing the medium support unit 10. The head 8 is a printing unit that is provided with a plurality of nozzles and forms an image by ejecting ink from the nozzles. The carriage 9 is mounted with the head 8, and is reciprocally movable in the width direction B. The main body unit 2 including the head 8 is provided with a housing, which is omitted in FIG. 1. The medium M is arranged at a position facing the head 8, via an insertion port 19 being a gap between the housing and the medium support unit 4. Note that, in the printing apparatus 1A of the present exemplary embodiment, the first direction A1 at a position on the medium support unit 10 facing the head 8 is the +Y direction, the second direction A2 is the −Y direction, the width direction B being a moving direction of the head 8 is a direction along the X-axis direction, and an ink ejection direction is the −Z direction. Further, the insertion port 19 is not required to form an opening having a closed periphery. When there is established a configuration in which the insertion port 19 is at a position upstream of the roller pair 7 in the first direction A1 in the transport path of the medium M and allows the medium M to pass through in the first direction A1 between the driving roller 5 and the driven rollers 6 of the roller pair 7, the configuration may be regarded as the insertion port 19.

With the configuration described above, the head 8 is capable of forming an image by ejecting ink from the nozzles (not illustrated) onto the medium transported, while the head 8 reciprocates in the width direction B being a direction intersecting with the first direction A1 and the second direction A2. The printing apparatus 1A of the present exemplary embodiment is capable of forming a desired image on the medium M by repeating transport of the medium M by a predetermined transport amount in the first direction A1 and ejection of ink in a state in which the medium M is stopped while the head 8 moves in the width direction B. However, in place of the head thus configured, there may be adopted a configuration in which a so-called line head is included. In the line head, nozzles for ejecting ink are provided throughout in the X-axis direction.

Further, a holding unit 12 is provided downstream of the medium support unit 11 in the first direction A1. The holding unit 12 is a winding unit that winds the medium M transported in the first direction A1 into a roll shape to obtain a roll body R2. Note that, in the printing apparatus 1A of the present exemplary embodiment, the holding unit 3 and the holding unit 12 include similar configurations, and are configured to support paper tubes being rotation centers of the roll body R1 and the roll body R2 to rotate the paper tubes in the rotation direction C. The holding unit 12 is provided to an arm 15 attached to the pipe (not illustrated) for coupling the legs 13 on both sides in the X-axis direction.

In the printing apparatus 1A of the present exemplary embodiment, when the medium M is set before printing, a user causes the holding unit 3 to hold the roll body R1, causes the medium M to pass through between the driving roller 5 and the driven rollers 6 of the roller pair 7 via the insertion port 19, and feeds the leading edge of the medium M to the medium support unit 11. In this state, the gap between the driving roller 5 and the driven rollers 6 of the roller pair 7 is temporarily expanded, the medium M passes through the expanded gap, the leading edge of the medium M is fed to the medium support unit 11, and then the gap is narrowed. With this, the medium M is nipped between the driving roller 5 and the driven rollers 6. Here, when a user takes the hand off from the medium M without narrowing the gap after the leading edge of the medium M is fed to the medium support unit 11, there may be a risk that the medium M fed to the medium support unit 11 falls down onto the medium support unit 4 due to its own weight. In view of this, for facilitating narrowing of the gap after the leading edge of the medium M is fed to the medium support unit 11, the printing apparatus 1A of the present exemplary embodiment includes a lever 16 to be described later in detail. With this configuration, a user can easily expand or narrow the gap by moving the lever 16. In view of this, with reference to FIG. 2 to FIG. 4, a first lever 16A being the lever 16 included in the printing apparatus 1A of the present exemplary embodiment is described below in detail.

Figure 2:
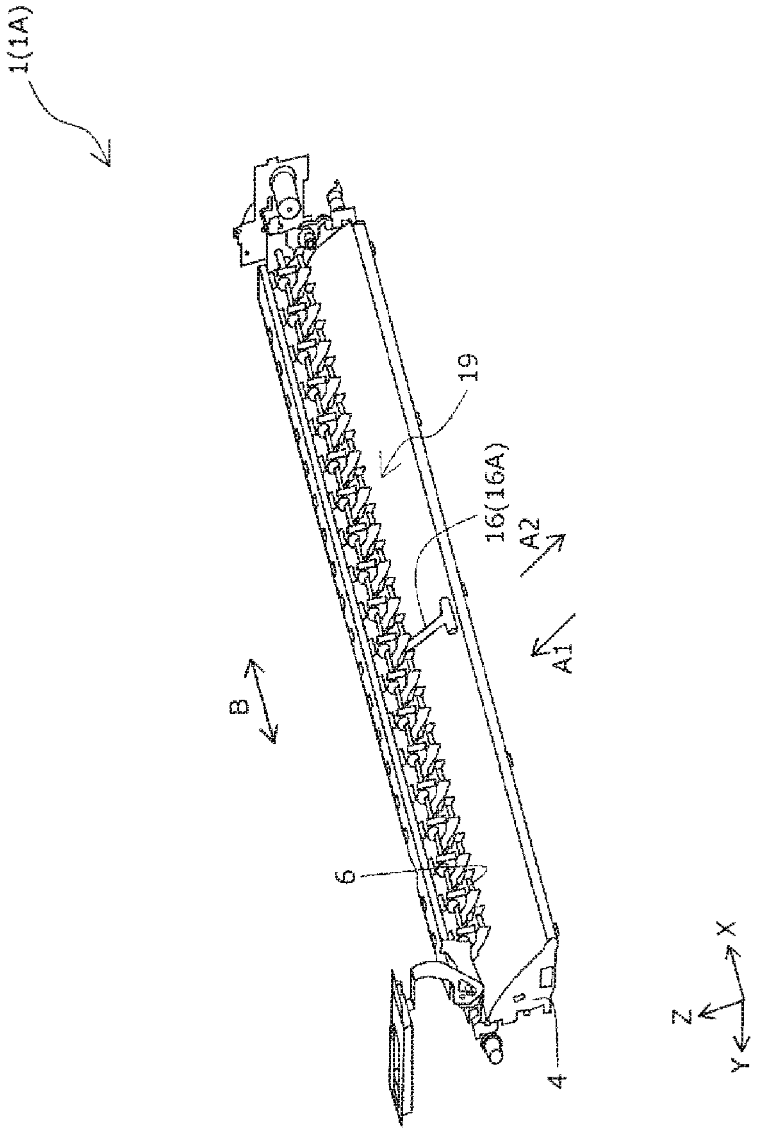
FIG. 2 is a perspective view illustrating a periphery of a lever of the printing apparatus of FIG. 1.
Figure 3:
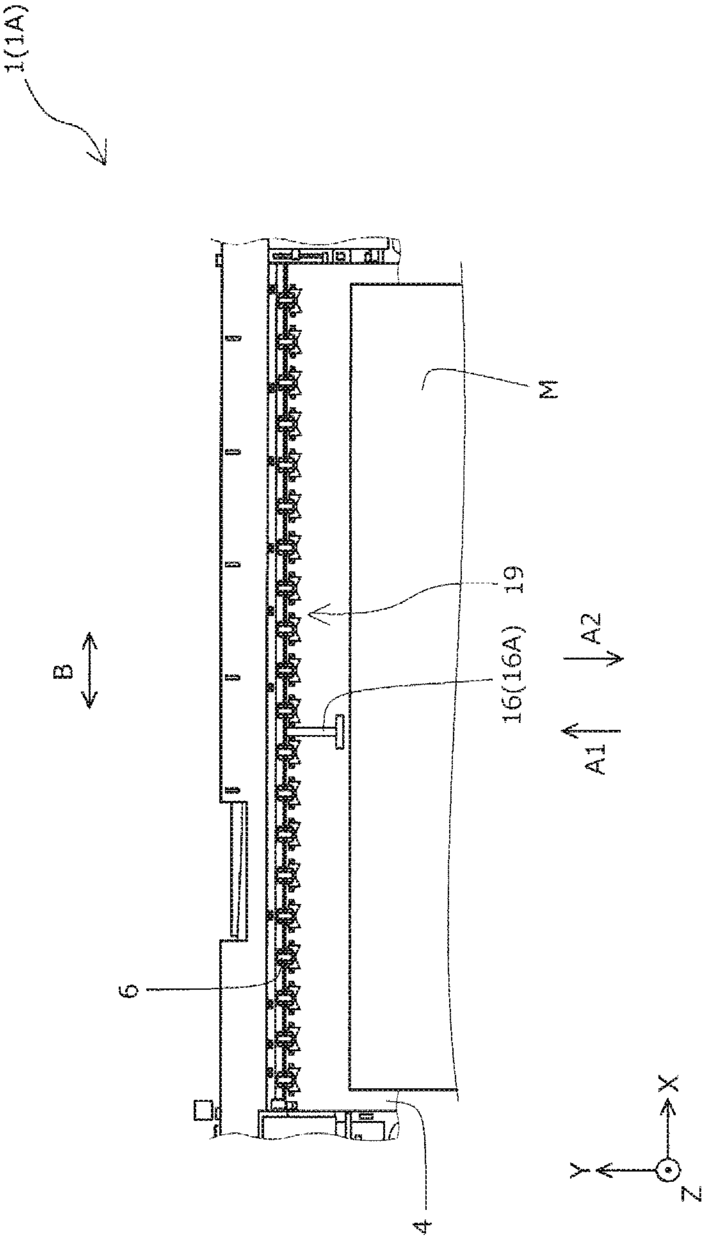
FIG. 3 is a back-side plan view illustrating the periphery of the lever of the printing apparatus of FIG. 1, and is a view illustrating a state in which a medium is set.
Figure 4:
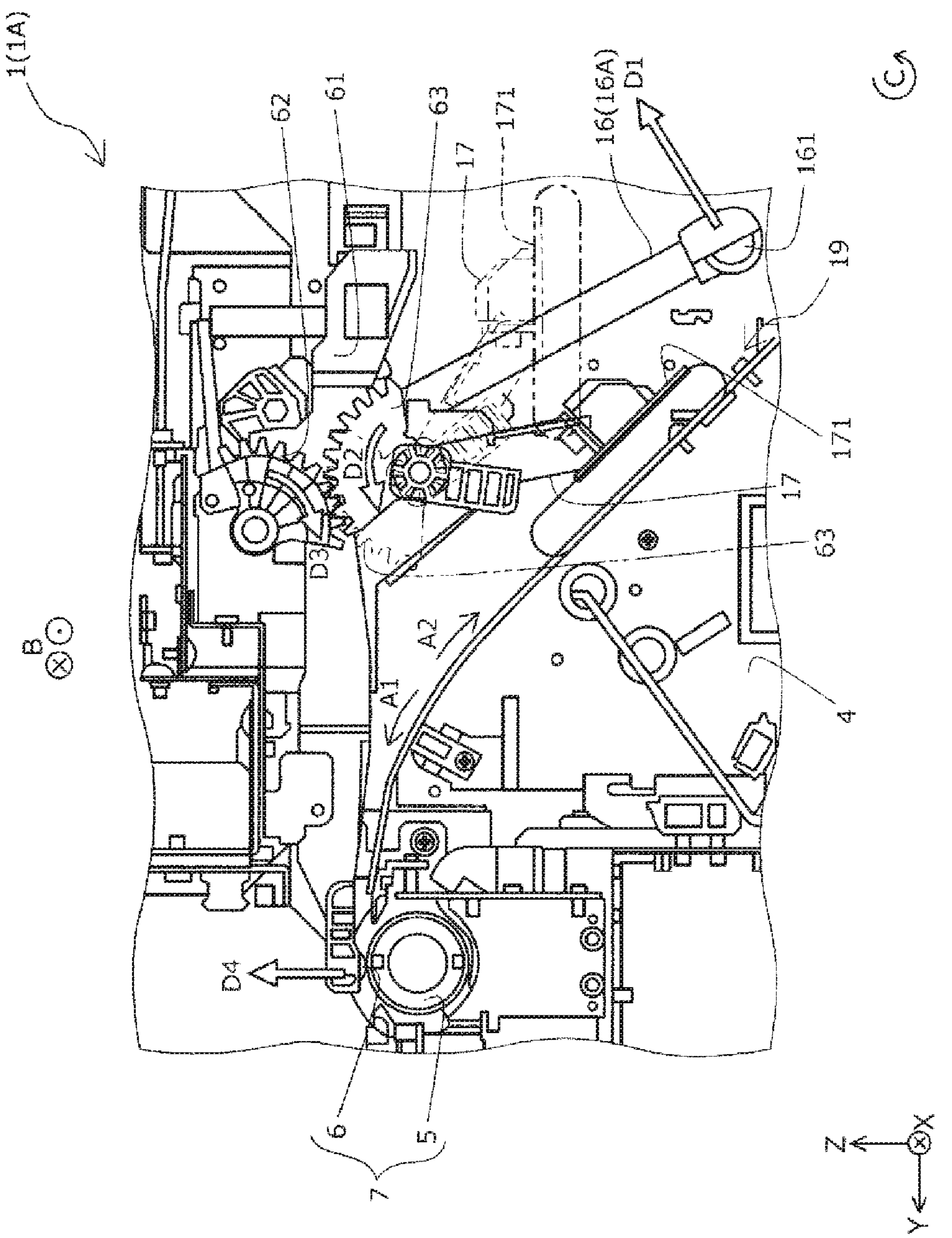
FIG. 4 is a side cross-sectional view illustrating the periphery of the lever of the printing apparatus of FIG. 1.

As described above, the printing apparatus 1A of the present exemplary embodiment includes the insertion port 19 that is provided in the transport path of the medium M, the insertion port 19 through which the medium M is to be inserted. Further, the printing apparatus 1A of the present exemplary embodiment includes the roller pair 7 that nips and transports the medium M inserted through the insertion port 19, in the transport path, and the head 8 that performs printing on the medium M transported in the transport path by the roller pair 7. Further, as illustrated in FIG. 2 to FIG. 4, the printing apparatus 1A of the present exemplary embodiment includes the lever 16 that switches a position of the facing rollers of the roller pair 7 between a nipping position where the facing rollers are configured to nip the medium M and a separation position where the facing rollers do not nip the medium M. Here, as illustrated in FIG. 3, the first lever 16A being the lever 16 of the present exemplary embodiment is arranged in a part close to the center of the printing apparatus 1A in the width direction B intersecting with the first direction A1 being the transport direction of the medium M, that is, within a range in which the medium M transported by the roller pair 7 is present.

Thus, with the printing apparatus 1A of the present exemplary embodiment, a user can set the medium M alone while the user presses the medium M, and operability for setting the medium can be improved. Further, the first lever 16A is provided in the part close to the center of the printing apparatus 1A in the width direction B. Thus, even when a user is on either one of the end sides of the medium M in the width direction B to suppress bending of the end of the medium M in the width direction B, the user can perform setting alone while the user presses the medium M. Note that, in the configuration in which the media M having a plurality of different widths can be used in the printing apparatus 1, the expression "within the range in which the medium M transported by the roller pair 7 is present" may indicate a range in which the medium M having the maximum width is present. However, the range may be a range in which the medium M having a minimum width is present.

Here, with reference to FIG. 4, a configuration of the first lever 16A is described in detail. AS illustrated in FIG. 4, the first lever 16A extends from a base portion 162 to a handle portion 161 in a direction substantially along the first direction A1 and the second direction A2. In other words, the first lever 16A is provided extending in an advancing and retreating direction of the medium M with respect to the insertion port 19. With this configuration, a user can easily perform an operation by using the first lever 16A. With the printing apparatus 1A of the present exemplary embodiment, operability of the first lever 16A for setting the medium M can be particularly improved.

Further, the first lever 16A includes a fan-shaped toothed gear portion 63 at the base portion 162. Further, the driven rollers 6 of the roller pair 7 are provided to one end of an arm-shaped member 61 including a fan-shaped toothed gear portion 62 meshed with the toothed gear portion 63. When a user lifts up the handle portion 161 of the first lever 16A in a direction D1, the toothed gear portion 63 rotates in a rotation direction D2, and the toothed gear portion 62 rotates in a rotation direction D3. Then, the driven rollers 6 are lifted up in a direction D4. Note that, when a user presses down the handle portion 161 of the first lever 16A in a direction opposite to the direction D1, the toothed gear portion 62 and the toothed gear portion 63 rotate in directions opposite to the above-mentioned directions, and the driven rollers 6 are pressed down in a direction opposite to the direction D4. However, the shape of the first lever 16A is not particularly limited.

Note that on a side close to the base portion 162 of the first lever 16A, a foreign matter capturing unit 17 is attached. To the foreign matter capturing unit 17, cloth 171 for adsorbing a foreign matter or the like is attached. When a user lifts up the handle portion 161 of the first lever 16A in the direction D1, the foreign matter capturing unit 17 is away from the transport path of the medium M. When a user presses down the handle portion 161 of the first lever 16A in the direction opposite to the direction D1, the foreign matter capturing unit 17 approaches the transport path of the medium M. A user can replace the cloth 171 for adsorbing a foreign matter at a position at which the foreign matter capturing unit 17 is away from the transport path of the medium M.

Further, in the printing apparatus 1A of the present exemplary embodiment, as illustrated in FIG. 1 and FIG. 4, the insertion port 19 is arranged below the roller pair 7 in the vertical direction. Thus, in the printing apparatus 1A of the present exemplary embodiment, the medium M is easily inserted from below. Further, in a configuration in which the medium is inserted from below, operability for setting the medium can be improved.

Here, the height at which the insertion port 19 is arranged may be 1,000 mm or lower. This is because a user can easily insert the medium M through the insertion port 19 while the user squats down. Meanwhile, the height at which the insertion port 19 is arranged may be 300 mm or higher. When the height is lower than 300 mm, a user cannot easily insert the medium M through the insertion port 19 while the user squats down.

Further, the first lever 16A may be arranged at the center of the printing apparatus 1A in the width direction B, or at a position within 22 inches from the center. With this configuration, a user easily reaches the first lever 16A by hand. In particular, even when a user is on either one of the end sides of the medium M in the width direction B to suppress bending of the end of the medium M in the width direction B, the user can easily reach the first lever 16A by hand.

Note that the printing apparatus 1A of the present exemplary embodiment is configured so that the medium M measuring 44 inches or larger in the width direction B can be used. In general, in a configuration in which the medium M having a large width of 44 inches or larger in the width direction can be used, operability for setting the medium M is easily degraded. However, in the printing apparatus 1A of the present exemplary embodiment, even when the medium M measuring 44 inches or larger in the width direction is used, a user can easily reach the first lever 16A by hand, and operability for setting the medium M is improved.

Further, as illustrated in FIG. 4, the printing apparatus 1A of the present exemplary embodiment includes the foreign matter capturing unit 17 that suppresses entry of a foreign matter through the insertion port 19. The foreign matter capturing unit 17 can be displaced between a foreign matter capturing position where the foreign matter capturing unit 17 is configured to come into contact with the medium M transported, which is indicated with the solid line in FIG. 4, and a retracting position where the foreign matter capturing unit 17 does not come into contact with the medium M transported, which is indicated with the two-dot chain line in FIG. 4. Further, the first lever 16A is configured to switch the foreign matter capturing unit 17 between the foreign matter capturing position and the retracting position. Thus, the printing apparatus 1A of the present exemplary embodiment can suppress entry of a foreign matter through the insertion port 19. At the same time, the first lever 16A is capable of also functioning as a switching unit for the foreign matter capturing unit 17, and hence there is no need to additionally provide a switching unit for the foreign matter capturing unit 17.

Further, the first lever 16A is configured to switch the foreign matter capturing unit 17 between the foreign matter capturing position and the retracting position, in conjunction of displacement of the position of the driving roller 5 and the driven rollers 6 that are the facing rollers of the roller pair 7. With this configuration, switching of the foreign matter capturing unit 17 can be particularly facilitated.

Second Exemplary Embodiment

Figure 5:
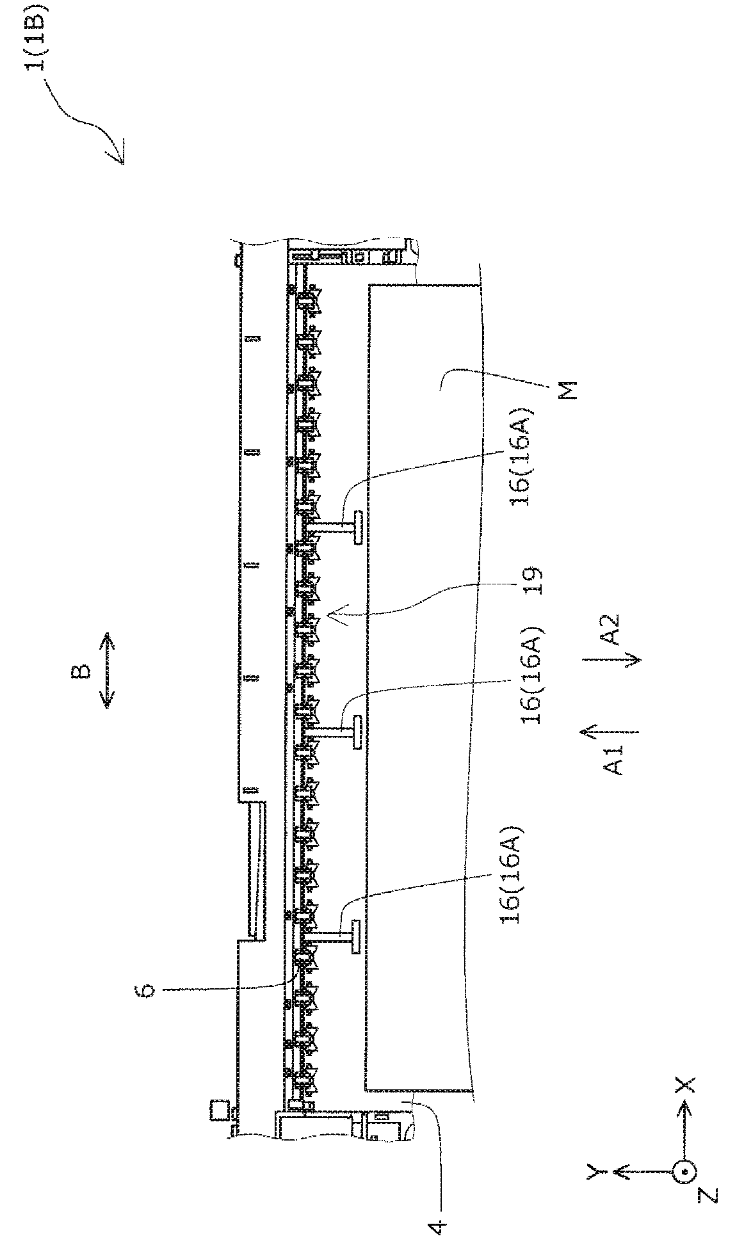
FIG. 5 is a back-side plan view illustrating a periphery of a lever of a printing apparatus according to a second exemplary embodiment of the present disclosure, and is a view illustrating a state in which a medium is set.

With reference to FIG. 5, a printing apparatus 1B being the printing apparatus 1 of a second exemplary embodiment is described below. FIG. 5 is a diagram corresponding to FIG. 3 in the printing apparatus 1A of the first exemplary embodiment. The printing apparatus 1B of the present exemplary embodiment is similar to the printing apparatus 1A of the first exemplary embodiment, except for the configuration described below. Specifically, the printing apparatus 1B of the present exemplary embodiment is different from the printing apparatus 1A of the first exemplary embodiment, only in the configuration of the lever 16. Thus, the printing apparatus 1B of the present exemplary embodiment has features similar to those of the printing apparatus 1A of the first exemplary embodiment, except for the matters described below. Thus, in FIG. 5, the component elements that are commonly shared in the first exemplary embodiment described above are denoted with the same reference symbols, and detailed description thereof is omitted.

As illustrated in FIG. 3 and the like, the printing apparatus 1A of the first exemplary embodiment includes the only one first lever 16A being the lever 16. Meanwhile, as illustrated in FIG. 5, the printing apparatus 1B of the present exemplary embodiment includes a plurality of the first levers 16A. Here, as described above, the first levers 16A correspond to the lever 16 arranged within the range in which the medium M transported by the roller pair 7 is present. As described above, the plurality of first levers 16A are included. With this configuration, even when the medium M having a large width is used, operability of the first lever 16A for setting the medium M can be improved. Note that, in the printing apparatus 1B of the present exemplary embodiment, each of the plurality of first levers 16A is configured similarly to the first lever 16A of the printing apparatus 1A of the first exemplary embodiment. However, the shapes of the plurality of first levers 16A are not particularly limited, and the plurality of first levers 16A may have shapes different from each other. Further, the arrangement and the number of the first levers 16A are not particularly limited.

Third Exemplary Embodiment

Figure 6:
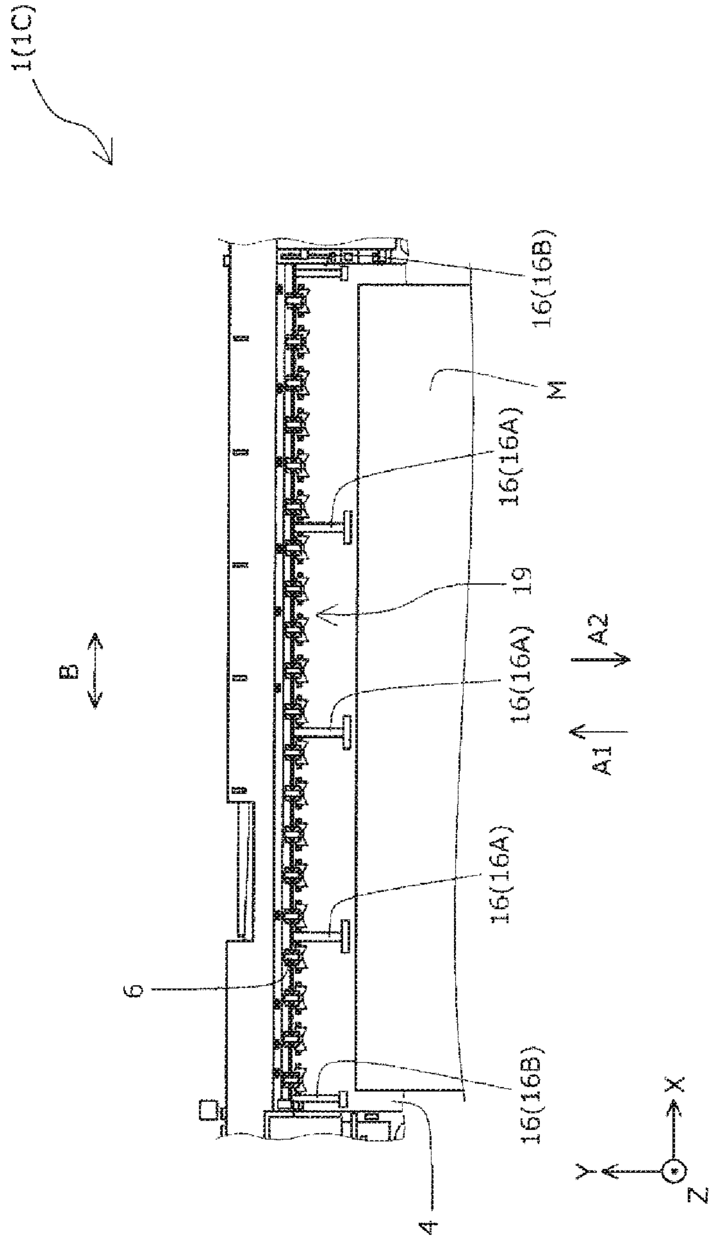
FIG. 6 is a back-side plan view illustrating a periphery of a lever of a printing apparatus according to a third exemplary embodiment of the present disclosure, and is a view illustrating a state in which a medium is set.

With reference to FIG. 6, a printing apparatus 1C being the printing apparatus 1 of a third exemplary embodiment is described below. FIG. 6 is a diagram corresponding to FIG. 3 in the printing apparatus 1A of the first exemplary embodiment and FIG. 5 in the printing apparatus 1B of the second exemplary embodiment. The printing apparatus 1C of the present exemplary embodiment is similar to the printing apparatus 1A of the first exemplary embodiment and the printing apparatus 1B of the second exemplary embodiment, except for the configuration described below. Specifically, the printing apparatus 1C of the present exemplary embodiment is different from the printing apparatus 1A of the first exemplary embodiment and the printing apparatus 1B of the second exemplary embodiment, only in the configuration of the lever 16. Specifically, as the levers 16, second levers 16B that are not arranged within the range in which the medium M transported by the roller pair 7 is present are included, in addition to the first levers 16A. Thus, the printing apparatus 1C of the present exemplary embodiment has features similar to those of the printing apparatus 1A of the first exemplary embodiment and the printing apparatus 1B of the second exemplary embodiment, except for the matters described below. Thus, in FIG. 6, the component elements that are commonly shared in the first exemplary embodiment and the second exemplary embodiment that are described above are denoted with the same reference symbols, and detailed description thereof is omitted.

As illustrated in FIG. 6, the printing apparatus 1C of the present exemplary embodiment includes the second levers 16B being the levers 16. The second levers 16B are arranged outside the range in which the medium M transported by the roller pair 7 is present. In other words, the printing apparatus 1C of the present exemplary embodiment includes, as the levers 16, the second levers 16B provided on the end sides with respect to the first levers 16A in the width direction B. Thus, even when the medium M having a large width is used in the printing apparatus 1C of the present exemplary embodiment, operability of the lever 16 for setting the medium M can be improved. At the same time, for example, when a user is present on an end side in the width direction B, the user can operate the lever 16 from the front side of the apparatus. Note that, in the printing apparatus 1C of the present exemplary embodiment, each of the plurality of first levers 16A and the second levers 16B is configured similarly to the first lever 16A of the printing apparatus 1A of the first exemplary embodiment. However, the shapes of the first levers 16A and the second levers 16B are not particularly limited, and the first levers 16A and the second levers 16B may have shapes different from each other. Further, the arrangement and the number of the first levers 16A and the second levers 16B are not particularly limited.

The present disclosure is not limited to the exemplary embodiments described above, and may be realized in various configurations without departing from the gist of the present disclosure. Further, appropriate replacements or combinations may be made to the technical features in the present embodiments which correspond to the technical features in the aspects described in the SUMMARY section to solve some or all of the problems described above or to achieve some or all of the advantageous effects described above. Further, when the technical features are not described herein as essential technical features, such technical features may be deleted appropriately.

What is claimed is:

1. A printing apparatus, comprising:

an insertion port that is provided in a transport path of a medium and through which the medium is to be inserted;

a roller pair configured to nip and transport the medium inserted through the insertion port, in the transport path, the roller pair comprises a drive roller and driven rollers;

a first rotating shaft that is provided over a range in which the medium transported by the roller pair is present, in a width direction intersecting with a transport direction of the medium;

a printing unit configured to perform printing on the medium transported in the transport path by the roller pair; and a lever configured to switch a position of the drive roller and the driven rollers of the roller pair all at once between a nipping position where the roller pair is configured to nip the medium and a separation position where the roller pair does not nip the medium, by moving the lever to rotate the rotating shaft, wherein a first lever as the lever is arranged within the range, the drive roller is provided over the range, the driven rollers are provided in a position opposite the drive roller and aligned over the range, the first rotating shaft is connected to the driven rollers via arm-shaped members, the printing unit has a carriage that moves in the width direction that intersects the transport direction of the medium, the transport path has an inclined transport path inclined with respect to the vertical direction, and the lever overlaps the inclined transport path when viewed horizontally from a direction orthogonal to the width direction.

2. The printing apparatus according to claim 1, wherein the first lever is provided extending in an advancing direction and a retreating direction of the medium with respect to the insertion port.

3. The printing apparatus according to claim 1, wherein the printing apparatus includes a plurality of the first levers.

4. The printing apparatus according to claim 1, further comprising a foreign matter capturing unit configured to suppress entry of a foreign matter through the insertion port, wherein the foreign matter capturing unit is configured to be displaced between a foreign matter capturing position where the foreign matter capturing unit is configured to come into contact with the medium transported and a retracting position where the foreign matter capturing unit does not come into contact with the medium transported and the first lever is configured to switch the foreign matter capturing unit between the foreign matter capturing position and the retracting position.

5. The printing apparatus according to claim 4, wherein the first lever is configured to switch the foreign matter capturing unit between the foreign matter capturing position and the retracting position, in conjunction with the position of the roller pair.

6. The printing apparatus according to claim 1, wherein the insertion port is arranged below the roller pair in a vertical direction.

7. The printing apparatus according to claim 1, wherein a height at which the insertion port is arranged is 1,000 mm or lower.

8. The printing apparatus according to claim 1, wherein the first lever is arranged at a position within 22 inches from a center of the printing apparatus in the width direction.

9. The printing apparatus according to claim 1, wherein the printing apparatus is configured to be used with the medium measuring 44 inches or larger in the width direction.

10. The printing apparatus according to claim 1, wherein the lever overlaps the inclined transport path when viewed vertically.

11. The printing apparatus according to claim 1, wherein the lever is in a first position when the roller pair is in the separating position, the lever is in a second position when the roller pair is in the nipping position, and the distance between the position of the lever in the second position and the media in the inclined transport path is closer than the distance between the position of the lever in the first position and the media in the inclined transport path.

12. The printing apparatus according to claim 1, further comprising:

a second rotating shaft that is different from and along the first rotating shaft, wherein the first rotating shaft has first gears corresponding to the arm-shaped members, the second rotating shaft has second gears meshing in each of the first gears, and the lever is connected to the second rotating shaft.

13. A printing apparatus, comprising:

an insertion port that is provided in a transport path of a medium and through which the medium is to be inserted;

a roller pair configured to nip and transport the medium inserted through the insertion port, in the transport path, the roller pair comprises a drive roller and driven rollers;

a first rotating shaft that is provided over a range in which the medium transported by the roller pair is present, in a width direction intersecting with a transport direction of the medium;

a printing unit configured to perform printing on the medium transported in the transport path by the roller pair; and a lever configured to switch a position of the drive roller and the driven rollers of the roller pair all at once between a nipping position where the roller pair is configured to nip the medium and a separation position where the roller pair does not nip the medium, by moving the lever to rotate the rotating shaft, wherein a first lever as the lever is arranged within the range, the drive roller is provided over the range, the driven rollers are provided in a position opposite the drive roller and aligned over the range, the first rotating shaft is connected to the driven rollers via arm-shaped members, further comprising a second lever being arranged outside the range in which the medium transported by the roller pair is present, in the width direction.

14. A printing apparatus, comprising:

an insertion port that is provided in a transport path of a medium and through which the medium is to be inserted;

a roller pair configured to nip and transport the medium inserted through the insertion port, in the transport path, the roller pair comprises rollers facing each other;

a printing unit configured to perform printing on the medium transported in the transport path by the roller pair;

a lever configured to switch a position of at least one roller of the roller pair between a nipping position where the roller pair is configured to nip the medium and a separation position where the roller pair does not nip the medium; and a foreign matter capturing unit configured to suppress entry of a foreign matter through the insertion port, wherein a first lever as the lever is arranged within the range in which the medium transported by the roller pair is present, in a width direction intersecting with a transport direction of the medium, the foreign matter capturing unit is configured to be displaced between a foreign matter capturing position where the foreign matter capturing unit is configured to come into contact with the medium transported and a retracting position where foreign matter capturing unit does not come into contact with the medium transported, and the first lever is configured to switch the foreign matter capturing unit between the foreign matter capturing position and the retracting position.

* * * * *